United States Patent [19]

Campbell, Jr. et al.

[11] Patent Number: 4,774,301

[45] Date of Patent: Sep. 27, 1988

[54] ZIRCONIUM CONTAINING CATALYSTS AND METHOD OF USE

[75] Inventors: Richard E. Campbell, Jr.; Gregory F. Schmidt, both of Midland, Mich.

[73] Assignee: The Dow Chemical Company, Midland, Mich.

[21] Appl. No.: 59,099

[22] Filed: Jun. 8, 1987

[51] Int. Cl.$^4$ ............................ C08F 4/64; C08F 12/08
[52] U.S. Cl. ................................. 526/165; 502/117; 526/161; 526/347.2
[58] Field of Search .............................. 526/161, 165

[56] References Cited

U.S. PATENT DOCUMENTS 3,014,887  12/1961  Howard ........................... 526/347.2
3,414,553  12/1968  Kern ................................. 526/159
4,544,762  10/1985  Kaminsky et al. ................ 556/179
4,680,353   7/1987  Ishihara et al. ................... 526/160

FOREIGN PATENT DOCUMENTS 129368  12/1984  European Pat. Off. .
210615   2/1987  European Pat. Off. .

*Primary Examiner*—Edward J. Smith
*Attorney, Agent, or Firm*—Douglas N. Deline

[57] ABSTRACT

Polymers of vinyl aromatic monomers having a high degree of syndiotacticity are prepared by contacting with a catalyst comprising a zirconium (IV) complex and polymethylaluminoxane under polymerization conditions.

8 Claims, No Drawings

ZIRCONIUM CONTAINING CATALYSTS AND METHOD OF USE

BACKGROUND OF THE INVENTION

The present invention relates to catalysts. More particularly, the present invention relates to such novel catalysts containing a zirconium compound and an organo aluminum compound. Such catalysts are particularly useful for the preparation of polymers of vinyl aromatic monomers having a high degree of syndiotactic molecular structure.

It is previously known in the art to prepare polystyrene having a high degree of syndiotacticity by polymerizing styrene monomer in the presence of a catalyst containing a titanium compound and an aluminum organo compound. This work has been reported by N. Ishihara, et al., in Macromolecules, 19, Page 2464–2465 (1986).

The same researchers later reported that zirconium based catalysts, specifically $ZrCl_4$, and biscyclopentadienyl zirconium dichloride in combination with polymethylaluminoxane gave only atactic polystyrene, Polymer Preprints (Japan), vol. 36. No. 2 May 12, 1987.

SUMMARY OF THE INVENTION

According to the present invention there is now provided a novel catalyst comprising the reaction product of polymethylaluminoxane and a zirconium (IV) complex corresponding to the formula: $ZrXR_3$, wherein X is halide or R, and R is independently each occurrence selected from the ligand group consisting of alkoxides and aryloxides corresponding to the formula: OR', amides corresponding to the formula: $NR'_2$, phosphides corresponding to the formula: $PR'_2$, and $\beta$-diketonates corresponding to the formula: R'—C(O)—CH—C-(O)—R', and R' is alkyl or aryl of up to 12 carbons. In addition, there is also included within the present invention a process for the use of such novel catalysts in the preparation of polymers of vinyl aromatic monomers having a high degree of syndiotacticity. Such polymers may be usefully employed in the preparation of articles and objects having an extremely high resistance to deformation due to the effects of temperature.

DETAILED DESCRIPTION OF THE INVENTION

The polymethylaluminoxane may be prepared according to any known technique. One such technique includes the reaction of trimethylaluminum and a hydrated metal salt as disclosed by Kaminsky in U.S. Pat. No. 4,544,762, the teachings of which are herein incorporated in their entirety by reference thereto. For purposes of calculating the molar ratio of aluminum:zirconium in the catalysts of the present invention, the polymethylaluminoxane is assigned a repeating unit structure corresponding to the formula: $(Al(CH_3)O)$.

Following preparation of polymethylaluminoxane a zirconium (IV) complex as previously defined is added to the polymethylaluminoxane along with additional diluent if desired. It is understood that the zirconium complex may be employed in the form of a precursor that is capable of generating the desired zirconium catalyst complex in situ. An example includes such zirconium complexes additionally incorporating one or more molecules of any nature in the crystal structure, such a aliphatic or aromatic alcohol molecules associated with the crystal structure via Van der Waals forces. In the preparation of the catalyst composition, the zirconium (IV) complex and the polymethylaluminoxane can be combined in any order. The catalyst components may be suitably mixed in an inert atmosphere such as nitrogen, argon, xenon, or combinations thereof. The components are mixed at any suitable temperature preferably from about 0° C. to about 50° C., more suitably about 25° C.

The components of the catalyst are employed in quantities which provide an atomic ration of Al:Zr suitably from about 50:1 to about 10,000:1, more suitably from about 100:1 to about 5,000:1, most suitably from about 250:1 to about 1000:1.

Preferred zirconium (IV) complexes are zirconium tetraalkoxides having from 2 to 4 carbons in the alkyl group and zirconium tetraphenoxide. A most preferred zirconium (IV) complex is zirconium tetraisopropoxide.

Polymerizations utilizing the catalyst of the present invention may be conducted at temperatures from about 25° C. to about 100° C. Preferred temperatures are from about 30° C. to about 60° C.

Preferred polymerizations are those involving vinyl aromatic monomers due to the discovery that such polymers have a high degree of syndiotacticity. By the term "high degree" is meant at least about 50% syndiotacticity on a molar basis as determined by $C^{13}$ nuclear magnetic resonance spectroscopy. Suitable vinyl aromatic monomers include those monomers corresponding to the formula:

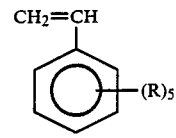

wherein each R is independently hydrogen, an aliphatic, cycloaliphatic or aromatic hydrocarbon group having up to about 10 carbon atoms, or a halogen atom. A preferred vinyl aromatic monomer is styrene.

The polymerization is normally conducted in the presence of a solvent for the monomer. Examples include aliphatic and aromatic hydrocarbons, as well as mixtures thereof. Preferred solvents comprise the $C_{4-20}$ alkane, especially branched chain alkanes and mixtures thereof. A particularly desirable solvent for the polymerization is isooctane, or blends thereof such as Isopar E ®, available from Exxon. Suitable amounts of solvent are employed to provide a monomer concentration from about 5% to about 100% by weight. During the polymerization, polymer may precipitate from the reaction mixture as it is formed. Initially it is desirable to provide catalyst concentrations so as to provide a molar ratio of vinyl aromatic monomer to zirconium of from about 100:1 to about 30,000:1, most preferably 1,000:1 to about 10,000:1. Additionally, preferred polymers according to the invention have a syndiotacticity of greater than about 65%.

As in other similar polymerizations it is highly desirable that the monomers and solvents employed be of sufficienty high purity that catalyst deactivation not occur. Any suitable technique for monomer purification such as devolatilization at reduced pressures, or contacting with molecular sieves or high surface are alumina may be employed.

Purification of the resulting polymer to remove entrained catalyst may also be desired by the practitioner. Entrained catalyst may generally be identified by residues of ash on pyrolysis of the polymer that are attributable to aluminum and zirconium values. A suitable technique for removing such compounds is by solvent extraction, eg. extraction utilizing hot, high boiling chlorinated solvents, followed by filtration.

Having described the invention, the following example is provided as further illustrative and is not to construed as limiting.

EXAMPLE 1

In a nitrogen atmosphere glove box, a glass reactor was charged with Isopar E ® (32 milliliters) along with a suspension of polymethylaluminoxane (PMA) (0.1 grams in 40 milliliters of Isopar E ®). A 10 percent toluene solution of zirconium n-propoxide (62.5 microliters, 0.02 mmol) was added with stirring at room temperature. After approximately 30 seconds, highly pure deariated styrene monomer (12.5 grams, 0.12 moles) was added. The reactor was sealed and placed in a shaker in a hot water bath and maintained at 51° C. for 40 hours. The mixture was then hydrolyzed by the addition of 20 milliliters of methanol. The reactor contents were added to 50 milliliters of aqueous 1N. hydrochloric acid for five minutes. The resulting syndiotactic polystyrene was collected by filtration, washed with methanol and vacuum dried at 75° C. for 36 hours. Yield was 0.2 grams (1.6 percent). Melting point was 260.3° C. as determined by Differential Scanning Calorimetry. Syndiotacticity as determined by $C^{13}$ NMR was greater than 75%. Weight average molecular weight (Mw) was 13,600. Number average molecular weight (Mn) was 8,600. Mw/Mn was 1.58.

EXAMPLE 2

The procedure of Example 1 was substantially repeated employing 22.9 milliliters of Isopar E ®; 0.65 grams (11.2 mmoles) of polymethylaluminoxane in 16 milliliters of Isopar E ®, 35 microliters (0.0011 mmoles) of zirconium tetra n-propoxide as a 10 percent solution in heptane and 7.7 milliliters (0.0673 mmoles) of styrene. After working up in the procedure previously described, the yield of the polystyrene was 0.75 grams (10.7 percent) having a syndiotacticity of approximately 70 percent. Mw was 11,000. Mn was 6,500. Mw/Mn was 1.67.

EXAMPLES 3-6

The procedures of Example 1 were substantially repeated employing 163 mmoles of styrene monomer and 22.4 mmoles of zirconium complex catalyst along with a polymethylaluminoxane cocatalyst prepared in an aliphatic solvent (Isopar-E ®). Reactions were continued for 40 hours. Specific zirconium catalyst precursor complexes employed are further identified in Table I. In example 3, 11.2 mmoles of PMA cocatalyst were employed. In examples 4-6, 22.4 mmoles of PMA were employed. In calculating these molar amounts it was assumed that the repeating unit of PMA was (Al(CH$_3$)—O). The solvent in all polymerizations was Isopar-E ®. Results are contained in Table I.

TABLE I

| Example | Catalyst | Yield g. | Yield % | Syndiotacticity (%) | Melting Point (°C.) |
|---------|----------|----------|---------|---------------------|---------------------|
| 3 | a | 1.8 | 13.1 | 70 | 257 |
| 4 | b | 4.5 | 32.1 | 70 | 204 |
| 5 | c | 1.0 | 7.40 | 50 | — |
| 6 | d | 0.3 | 2.30 | — | 230 | a. Zirconium tetra n-propoxide
b. zirconium tetraisopropoxide
c. zirconium tetraacetylacetonate
d. zirconium tetra(diethylamide)

What is claimed is:

1. A process for the preparation of polymers of vinyl aromatic monomers having a high degree of syndiotacticity comprising contacting one or more vinyl aromatic monomers under polymerization conditions with a catalyst comprising the reaction product of polymethylaluminoxane and a zirconium (IV) complex corresponding to the formula: ZrXR$_3$, wherein X is halide or R, and R is independently each occurrence selected from the ligand group consisting of alkoxides and aryloxides corresponding to the formula: OR'; amides corresponding to the formula: NR'$_2$; phosphides corresponding to the formula: PR'$_2$; and β-diketonates corresponding to the formula: R'—C(O)—CH—C(O)—R', and R' is alkyl or aryl of up to 12 carbons.

2. A process according to claim 1, wherein the monomer is contacted with the catalyst at a temperature from about 25° C. to about 100° C.

3. A process according to claim 1, wherein an inert diluent is additionally present.

4. A process according to claim 1, wherein the polymer has a molecular structure containing greater than about 65 percent syndiotactic.

5. A process according to claim 1, wherein the zirconium (IV) complex is selected from the group consisting of zirconium tetraalkoxides having from 2 to 4 carbons in the alkyl group, and zirconium tetraphenoxide.

6. A process according to claim 1, wherein the zirconium (IV) complex is zirconium tetraisopropoxide.

7. A process according to claim 1, wherein the molar ratio of polymethylaluminoxane to zirconium is from about 10:1 to about 50,000:1.

8. A process according to claim 1, wherein the molar ratio of polymethylalmunioxane to zirconium is from about 100:1 to about 10,000:1

* * * * *

UNITED STATES PATENT AND TRADEMARK OFFICE
CERTIFICATE OF CORRECTION

PATENT NO. : 4,774,301
DATED : September 27, 1988
INVENTOR(S) : Richard E. Campbell, Jr. and Gregory F. Schmidt It is certified that error appears in the above-identified patent and that said Letters Patent is hereby corrected as shown below:

Column 1, line 66, "a" should read --as--.

Column 2, line 10, "ration" should read --ratio--.

Column 2, line 47, "alkane," should read --alkanes,--.

Column 2, line 64, "sufficienty" should read --sufficiently--.

Column 2, line 67, "are" should read --area--.

Column 4, line 54, "polymethylalmunioxane" should read --polymethylaluminoxane--.

Signed and Sealed this

Twenty-fifth Day of April, 1989

Attest:

DONALD J. QUIGG

*Attesting Officer*        *Commissioner of Patents and Trademarks*

Notice of Adverse Decisions in Interference

In Interference No. 102,177, involving Patent No. 4,774,301, R. E. Campbell, Jr., and G. F. Schmidt, ZIRCONIUM CONTAINING CATALYSTS AND METHOD OF USE, final judgment adverse to the patentees was rendered December 11, 1989, as to claims 1-8.
*(Official Gazette February 20, 1990)*